United States Patent
Yamazaki et al.

(10) Patent No.: US 11,047,289 B2
(45) Date of Patent: Jun. 29, 2021

(54) SUPPORT STRUCTURE FOR EXHAUST SYSTEM PART

(71) Applicants: TOYOTA JIDOSHA KABUSHIKI KAISHA, Toyota (JP); FUTABA INDUSTRIAL CO., LTD., Aichi-ken (JP); SANGO CO., LTD., Aichi (JP)

(72) Inventors: Nobutaka Yamazaki, Toyota (JP); Masaya Takeuchi, Okazaki (JP); Hirotoshi Tanaka, Nissin (JP)

(73) Assignees: TOYOTA JIDOSHA KABUSHIKI KAISHA, Toyota (JP); FUTABA INDUSTRIAL CO., LTD., Okazaki (JP); SANGO CO., LTD., Miyoshi (JP)

( * ) Notice: Subject to any disclaimer, the term of this patent is extended or adjusted under 35 U.S.C. 154(b) by 0 days.

(21) Appl. No.: 16/190,437

(22) Filed: Nov. 14, 2018

(65) Prior Publication Data

US 2019/0186331 A1 Jun. 20, 2019

(30) Foreign Application Priority Data

Dec. 18, 2017 (JP) .............................. JP2017-241766

(51) Int. Cl.
*F01N 13/18* (2010.01)
*B60K 13/04* (2006.01)
*F01N 13/16* (2010.01)

(52) U.S. Cl.
CPC .......... *F01N 13/1822* (2013.01); *B60K 13/04* (2013.01); *F01N 13/16* (2013.01);
(Continued)

(58) Field of Classification Search
CPC .. F01N 13/1822; F01N 13/16; F01N 2530/22; F01N 13/1805; F01N 13/18;
(Continued)

(56) References Cited

U.S. PATENT DOCUMENTS

| 5,445,241 A * | 8/1995 | Nakamura | ............. B60K 13/04 |
| | | | 180/296 |
| 6,530,443 B1 * | 3/2003 | Tsuruta | .................. F01N 13/08 |
| | | | 180/89.2 |

(Continued)

FOREIGN PATENT DOCUMENTS

| CN | 1499050 A | 5/2004 |
| JP | 2009-138601 A | 6/2009 |
| JP | 2010-138784 A | 6/2010 |

*Primary Examiner* — Christopher Garft
(74) *Attorney, Agent, or Firm* — Oliff PLC (57) ABSTRACT

A support structure for an exhaust system part that configures an exhaust system of an internal combustion engine for a vehicle includes a bracket and a support member. The bracket includes a first plate and a second plate. The first plate has both end portions attached to the second plate, and the second plate has both end portions attached to the exhaust system part. A first space is defined between the first plate and the second plate, and a second space is defined between the second plate and the exhaust system part. Each of the first space and the second space has a first open end disposed on the vehicle front side, and has a second open end disposed on the vehicle rear side. The first plate, the first space, the second plate, and the second space are disposed between the support member and the exhaust system part.

6 Claims, 4 Drawing Sheets

(52) U.S. Cl.
CPC ...... *F01N 13/1872* (2013.01); *F01N 2260/18* (2013.01); *F01N 2260/20* (2013.01); *F01N 2450/20* (2013.01); *F01N 2530/22* (2013.01)

(58) Field of Classification Search
CPC ............. F01N 13/1872; F01N 13/1877; F01N 2260/20; F01N 2450/20; B60K 13/04
See application file for complete search history.

(56) References Cited

U.S. PATENT DOCUMENTS

| | | | | |
|---|---|---|---|---|
| 7,165,645 | B2* | 1/2007 | Chae | B60K 13/04 |
| | | | | 180/309 |
| 8,602,158 | B2* | 12/2013 | Hayama | F01N 13/14 |
| | | | | 181/228 |
| 2001/0047897 | A1* | 12/2001 | Steenackers | B60K 13/04 |
| | | | | 180/89.2 |
| 2004/0089493 | A1 | 5/2004 | Chae | |
| 2005/0184201 | A1* | 8/2005 | Komitsu | B60K 13/04 |
| | | | | 248/58 |
| 2013/0075192 | A1* | 3/2013 | Hayama | F01N 3/2885 |
| | | | | 181/228 |
| 2014/0090926 | A1* | 4/2014 | Uzawa | F01N 1/08 |
| | | | | 181/228 |
| 2016/0108792 | A1* | 4/2016 | Kobe | F01N 13/1805 |
| | | | | 181/228 |
| 2018/0154765 | A1* | 6/2018 | Oyama | B60K 5/12 |
| 2018/0291793 | A1* | 10/2018 | Shende | F16B 7/04 |

* cited by examiner

SUPPORT STRUCTURE FOR EXHAUST SYSTEM PART

INCORPORATION BY REFERENCE

The disclosure of Japanese Patent Application No. 2017-241766 filed on Dec. 18, 2017 including the specification, drawings and abstract is incorporated herein by reference in its entirety.

BACKGROUND

1. Technical Field

The present disclosure relates to a support structure for an exhaust system part.

2. Description of Related Art

In the related art, a support structure for an exhaust system part configuring an exhaust system of an internal combustion engine for a vehicle is known (refer to, for example, Japanese Unexamined Patent Application Publication No. 2010-138784 (JP 2010-138784 A)).

The support structure disclosed in JP 2010-138784 A includes a support bracket that is attached to an exhaust system part, and a support rubber (a support member) that supports the support bracket. The support bracket includes a flat plate-shaped base plate, a support rod protruding from the base plate, and a flared part provided at a lower end portion of the base plate. The support rod is inserted into an insertion hole of the support rubber.

The flared part has an upper plate, a pair of side plates, and a front plate and is formed in a box shape. The upper plate is formed so as to protrude in the same direction as the support rod from the lower end portion of the base plate and is disposed so as to face the lower end of the support rubber. The side plates are formed so as to extend downward from both end portions of the upper plate in a width direction of the upper plate, and lower end portions of the side plates are welded to an exhaust system part. The front plate is formed so as to extend downward from the protruding end portion of the upper plate and is configured to connect the side plates.

In this support structure, a radiant heat from the exhaust system part due to a rise in the temperature of the exhaust system part is blocked off by the flared part, whereby thermal deterioration of the support rubber can be suppressed.

SUMMARY

However, in the support structure of the related art described above, when the temperature of the flared part increases due to the radiant heat from the exhaust system part, the heat of the flared part is transmitted to the support rubber through the base plate and the support rod, and therefore, there is room for improvement in suppression of the thermal deterioration of the support rubber.

The disclosure provides a support structure for an exhaust system part, in which it is possible to further suppress thermal deterioration of a support member.

An aspect of the disclosure relates to a support structure for an exhaust system part that configures an exhaust system of an internal combustion engine for a vehicle. The support structure includes a bracket made of metallic, the bracket being attached to the exhaust system part, and a support member configured to support the bracket, the support member being made of an elastic body. The bracket includes a first plate and a second plate. The first plate has both end portions in a direction crossing a vehicle front-rear direction, and the both end portions of the first plate are attached to the second plate. The second plate has both end portions in the direction crossing the vehicle front-rear direction, and the both end portions of the second plate are attached to the exhaust system part. A first space is defined between the first plate and the second plate, and a second space is defined between the second plate and the exhaust system part. Each of the first space and the second space has a first open end disposed on a vehicle front side, and has a second open end disposed on a vehicle rear side. The first plate, the first space, the second plate, and the second space are disposed between the support member and the exhaust system part.

With the configuration described above, the first plate and the second plate function as a double structure heat shield plate, so that heat transmission from the exhaust system part to the support member can be suppressed. That is, the radiant heat from the exhaust system part due to a rise in the temperature of the exhaust system part can be blocked off by the second plate, and therefore, the radiant heat from the exhaust system part can be restrained from being transmitted to the support member. Further, even though the temperature of the second plate rises due to the radiant heat from the exhaust system part, it is possible to make it difficult for the heat of the second plate to be transmitted to the first plate. Further, the bracket can be cooled by air passing through the first space and the second space.

In the support structure according to the above aspect of the disclosure, the bracket may include a hollow rod, a first end portion of the rod may be attached to the first plate, and a second end portion of the rod may be attached to the support member.

With the configuration described above, heat conduction from the first plate to the support member through the rod can be suppressed compared to a case where the rod is solid.

In the support structure according to the above aspect of the disclosure, the rod may have an opening portion and be disposed such that the opening portion faces the vehicle front side.

With the configuration described above, the rod can be cooled in a case where air flows into the rod, and therefore, a rise in the temperature of the rod can be suppressed.

In the support structure according to the above aspect of the disclosure, the exhaust system part may include a sub-muffler extending in the vehicle front-rear direction, and two sets of brackets and support members are provided such that one of the two sets is provided on a right side of the sub-muffler and the other one of the two sets is provided on a left side of the sub-muffler, and the two sets are provided symmetrically with respect to the sub-muffler.

With the configuration described above, thermal deterioration of the support member that supports the sub-muffler can be suppressed.

With the support structure for an exhaust system part according to the above aspect of the disclosure, it is possible to suppress the thermal deterioration of the support member.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment will be described based on the drawings. In the following, a support structure for supporting a sub-muffler configuring an exhaust system of an internal combustion engine that is mounted on a vehicle will be described.

Exhaust System of Internal Combustion Engine

Figure 1:
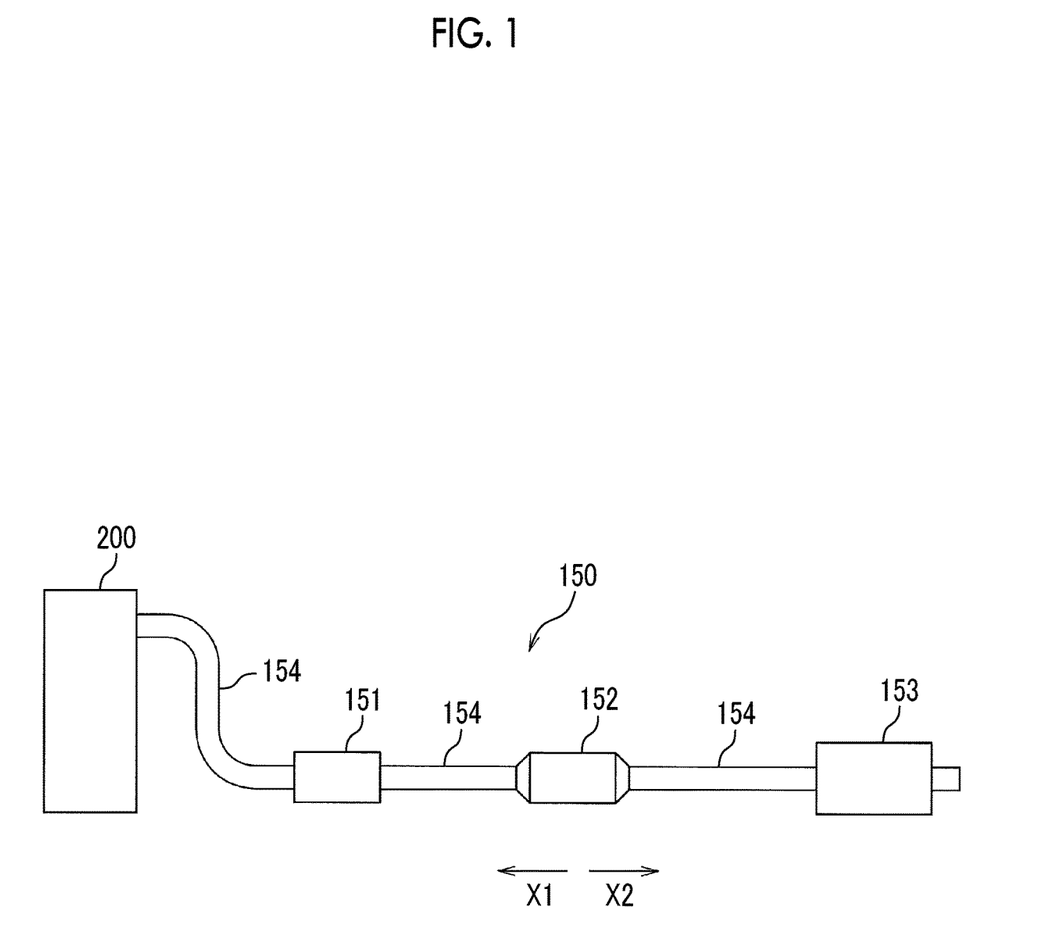
FIG. 1 is a schematic configuration diagram showing an example of an exhaust system of an internal combustion engine.

An example of an exhaust system 150 will be described with reference to FIG. 1.

The exhaust system 150 is provided so as to extend in a vehicle front-rear direction (X1 and X2 directions) and is configured to purify and silence exhaust gas from an internal combustion engine 200 and discharge the exhaust gas to the atmosphere. The exhaust system 150 includes a catalytic converter 151 for purifying harmful components in the exhaust gas, a sub-muffler 152 and a main muffler 153 for reducing exhaust sound, and an exhaust pipe 154 for connecting the catalytic converter 151, the sub-muffler 152, and the main muffler 153.

Sub-Muffler

An example of the sub-muffler 152 will be described with reference to FIG. 2.

The sub-muffler 152 is provided in order to remove high-frequency components of the exhaust sound, for example. The sub-muffler 152 is formed so as to extend in the vehicle front-rear direction and is disposed in a tunnel portion formed in a floor panel of a vehicle (not shown). The sub-muffler 152 includes a case 1521, and a sound deadening structure (not shown) accommodated in the case 1521, as shown in FIG. 2. In the sub-muffler 152, the temperature of the case 1521 is increased due to the exhaust gas passing through the interior thereof. The sub-muffler 152 is an example of an "exhaust system part".

The case 1521 is made of metal, for example, and is formed in a cylindrical shape. The case 1521 includes a case main body 1521a, an inflow portion 1521b into which the exhaust gas flows, an outflow portion 1521c through which the exhaust gas flows out, a diameter expansion portion 1521d formed between the inflow portion 1521b and the case main body 1521a, and a diameter reduction portion 1521e formed between the case main body 1521a and the outflow portion 1521c.

The case main body 1521a is formed in a cylindrical shape and is supported by a support structure 100 that will be described later. The exhaust pipe 154 (refer to FIG. 1) on the upstream side (the internal combustion engine 200 side) is connected to the inflow portion 1521b. The exhaust pipe 154 (refer to FIG. 1) on the downstream side (the atmosphere side) is connected to the outflow portion 1521c. The diameter expansion portion 1521d is formed such that the diameter thereof increases toward the downstream side from the upstream side, and the diameter reduction portion 1521e is formed such that the diameter thereof is reduced toward the downstream side from the upstream side. Due to the above, the case main body 1521a is formed so as to have a larger diameter than the exhaust pipe 154.

Support Structure

The support structure 100 according to this embodiment will be described with reference to FIG. 2 to FIG. 4.

The support structure 100 is configured to support the sub-mufflers 152 configuring the exhaust system 150. The support structure 100 includes a bracket 1 is made of metallic and is attached to the sub-muffler 152, and a support rubber 2 that supports the bracket 1. The support structure 100 is an example of the "support structure for an exhaust system part", and the support rubber 2 is an example of a "support member".

Figure 3:
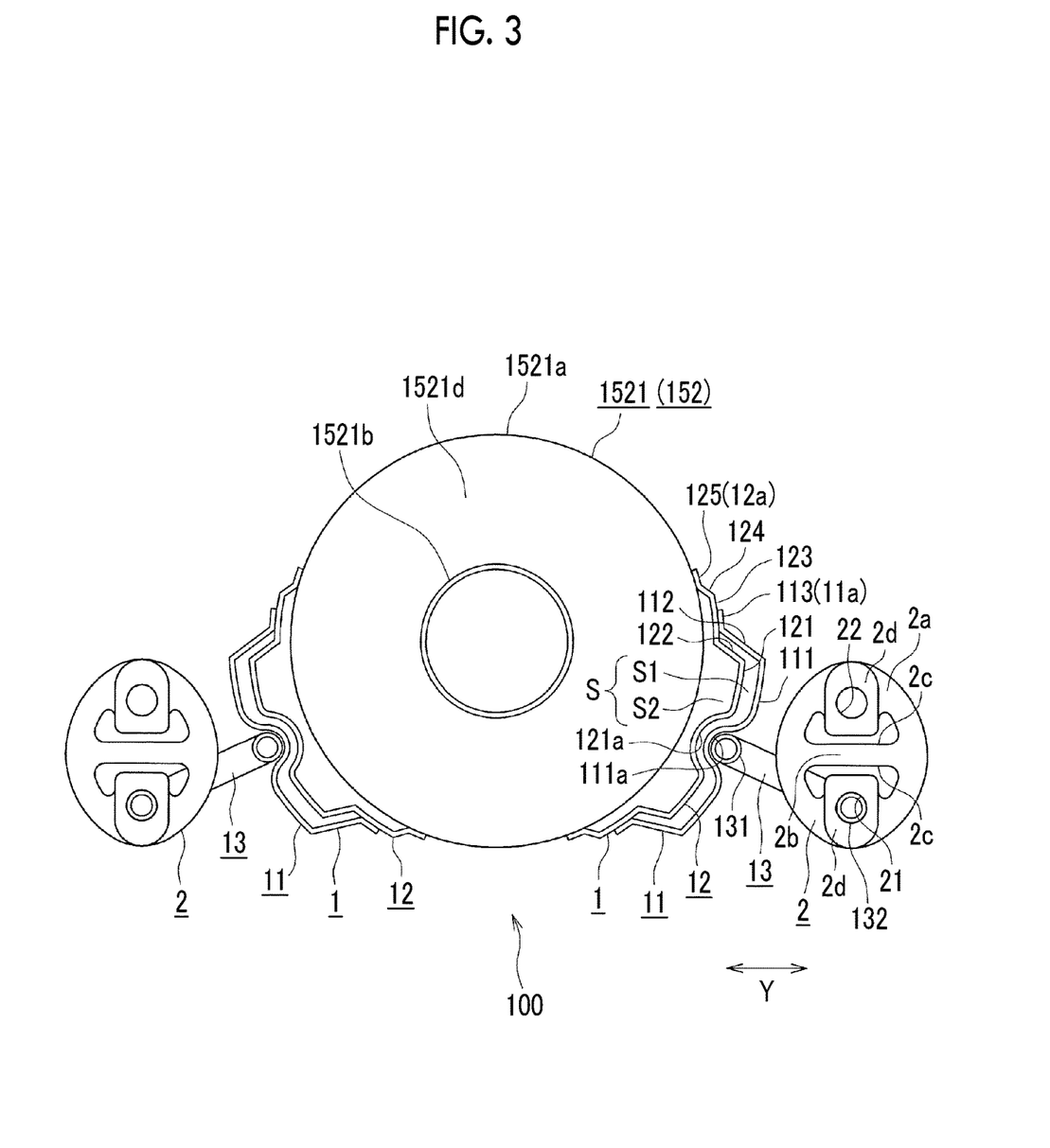
FIG. 3 is a front view of the support structure and the sub-muffler of FIG. 2.
Figure 4:
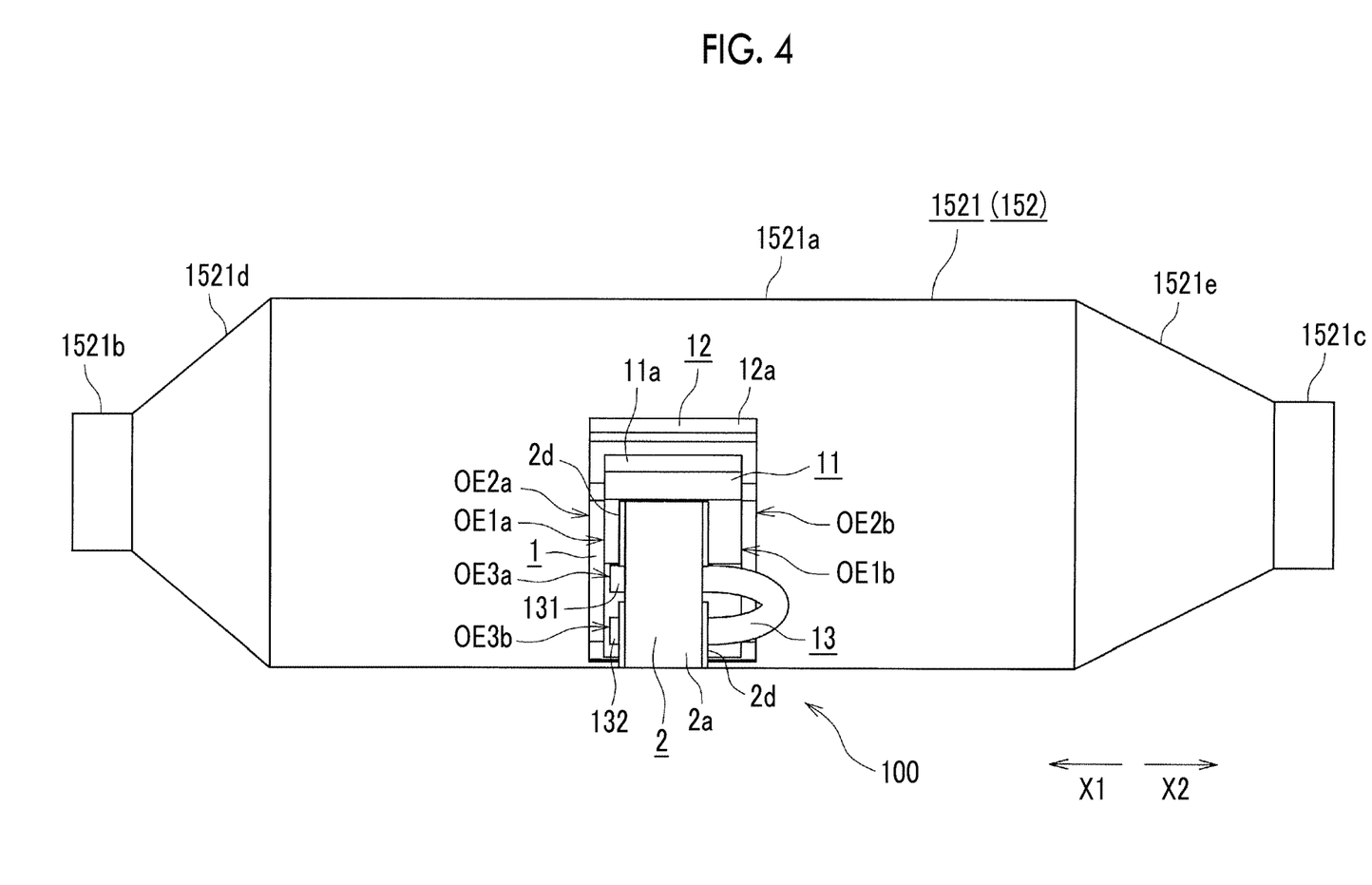
FIG. 4 is a side view of the support structure and the sub-muffler of FIG. 2.

In the support structure 100, as shown in FIG. 3, two sets of brackets 1 and support rubbers 2 are provided symmetrically in the right and left with respect to the sub-muffler 152, and the sub-muffler 152 is sandwiched between the two sets of brackets 1 and support rubbers 2 in a vehicle width direction (a Y direction). The support structure 100 is disposed substantially at the center in the vehicle front-rear direction (the X1 and X2 directions) of the sub-muffler 152, as shown in FIG. 4.

Figure 2:
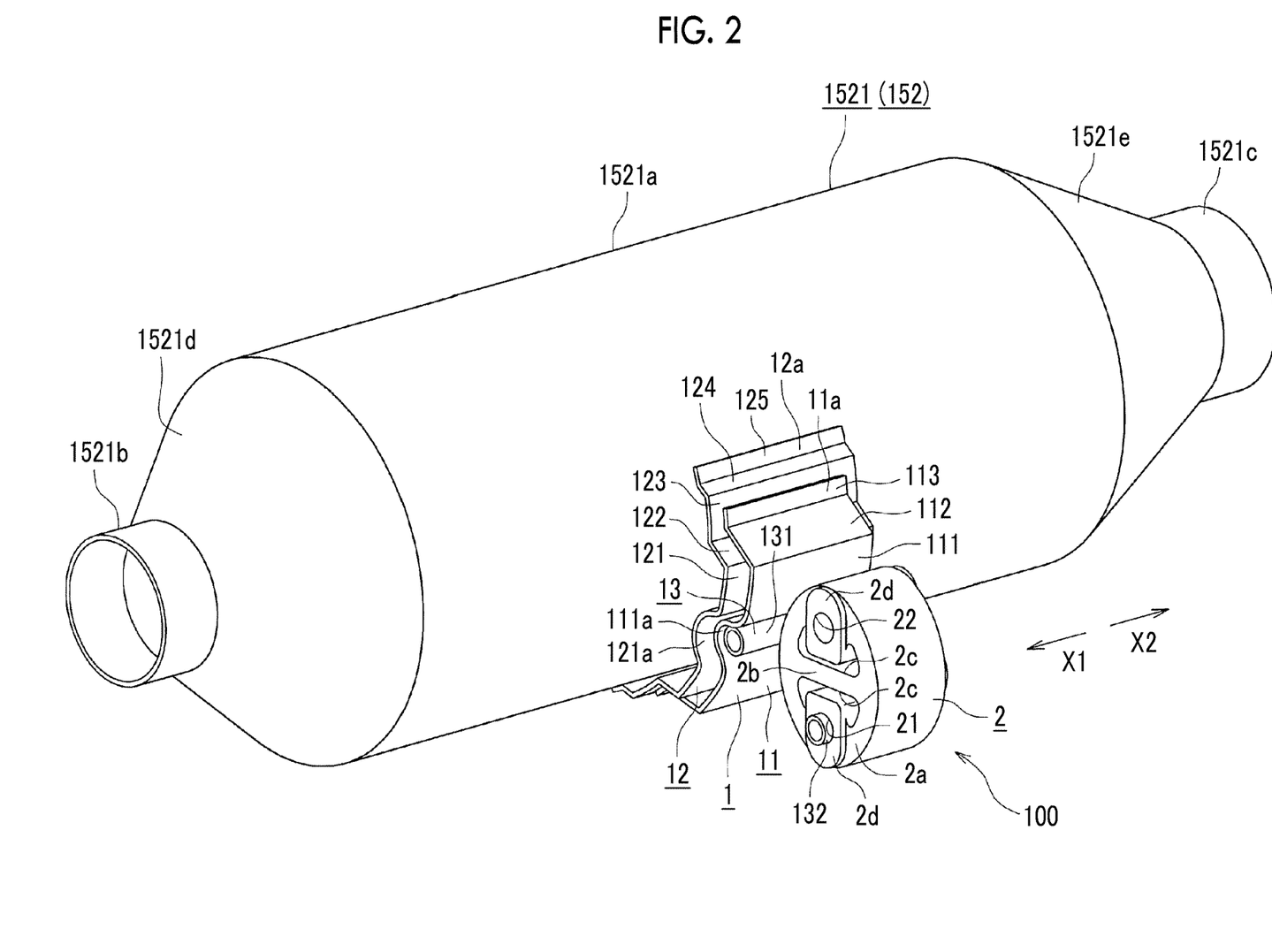
FIG. 2 is a perspective view showing a support structure of the present embodiment and a sub-muffler that is supported by the support structure.

The bracket 1 is attached to the case main body 1521a of the sub-muffler 152, as shown in FIG. 2 and FIG. 3. The bracket 1 is disposed obliquely downward in a circumferential direction of the case main body 1521a and disposed substantially at the center in the axial direction (the X1 and X2 directions) of the case main body 1521a. The bracket 1 includes a first plate 11, a second plate 12, and a rod 13.

The first plate 11 is a plate-shaped member made of metal, for example, and both end portions 11a in a longitudinal direction (the circumferential direction of the case main body 1521a) are attached to the second plate 12. Due to the above, a first space S1 (refer to FIG. 3) is formed between the first plate 11 and the second plate 12, and the first space S1 has a pair of open ends OE1a, OE1b (refer to FIG. 4) in a width direction of the first plate 11 (the axial direction of the case main body 1521a). The open end OE1a is disposed on the vehicle front side (the X1 direction side), and the open end OE1b is disposed on the vehicle rear side (the X2 direction side). The longitudinal direction of the first plate 11 is an example of a "direction crossing the vehicle front-rear direction". The open ends OE1a, OE1b are respectively examples of a "first open end" and a "second open end".

Specifically, the first plate 11 has a plate main body 111, a pair of side surface portions 112, and a pair of flange portions 113. The plate main body 111 is formed so as to follow the outer periphery of the case main body 1521a and has a groove-shaped portion 111a extending in the axial direction of the case main body 1521a. The groove-shaped portion 111a is formed in an arc shape when viewed in the axial direction such that the rod 13 can be disposed therein. Each of the side surface portions 112 is formed so as to extend toward the case main body 1521a side from each end portion (each end portion in the direction orthogonal to the axial direction) of the plate main body 111. The plate main body 111 and the side surface portions 112 are separated from the second plate 12. Each of the flange portions 113 is formed so as to protrude outward from each of the side surface portions 112. The flange portions 113 are disposed at both end portions 11a in the longitudinal direction of the first plate 11 and joined to the second plate 12.

The second plate 12 is a plate-shaped member made of metal, for example, and both end portions 12a in the longitudinal direction (the circumferential direction of the case main body 1521a) are attached to the case main body 1521a. Due to the above, a second space S2 (refer to FIG.

3) is formed between the second plate 12 and the case main body 1521a, and the second space S2 has a pair of open ends OE2a, OE2b (refer to FIG. 4) in a width direction of the second plate 12 (the axial direction of the case main body 1521a). The open end OE2a is disposed on the vehicle front side (the X1 direction side), and the open end OE2b is disposed on the vehicle rear side (the X2 direction side). The longitudinal direction of the second plate 12 is an example of the "direction crossing the vehicle front-rear direction". The open ends OE2a, OE2b are respectively examples of the "first open end" and the "second open end".

Specifically, the second plate 12 has a plate main body 121, a pair of inner side surface portions 122, a pair of mounting base portions 123, a pair of outer side surface portions 124, and a pair of flange portions 125. The plate main body 121 is formed so as to follow the outer periphery of the case main body 1521a and has a groove-shaped portion 121a extending in the axial direction of the case main body 1521a. The groove-shaped portion 121a is provided in order to avoid interference with the groove-shaped portion 111a. Each of the inner side surface portions 122 is formed so as to extend toward the case main body 1521a side from each end portion (each end portion in the direction orthogonal to the axial direction) of the plate main body 121. Each of the mounting base portions 123 is formed so as to protrude outward from the inner side surface portion 122 and formed so as to follow the outer periphery of the case main body 1521a. The flange portion 113 of the first plate 11 is joined to the surface of the mounting base portion 123 on the side opposite to the surface on the case main body 1521a side. Each of the outer side surface portions 124 is formed so as to extend toward the case main body 1521a side from each of the mounting base portions 123. The plate main body 121, the inner side surface portions 122, the mounting base portions 123, and the outer side surface portions 124 are separated from the case main body 1521a. Each of the flange portions 125 is formed so as to protrude outward from each of the outer side surface portions 124. The flange portions 125 are disposed at both end portions 12a in the longitudinal direction of the second plate 12 and joined to the case main body 1521a. That is, the first plate 11 is mounted on the case main body 1521a through the second plate 12 and disposed on the support rubber 2 side with respect to the second plate 12.

The rod 13 is a rod-shaped member made of metal, for example, and is formed in a U-shape. The outer shape of the rod 13 is formed in a circular shape. The rod 13 is hollow and has opening portions OE3a, OE3b (refer to FIG. 4) on both end faces thereof. The rod 13 has a first end portion 131 that is attached to the bracket 1, and the second end portion 132 that is attached to the support rubber 2. The first end portion 131 is disposed in the groove-shaped portion 111a of the first plate 11 and joined to the groove-shaped portion 111a. The opening portion OE3a on the first end portion 131 side and the opening portion OE3b on the second end portion 132 side are disposed so as to face the vehicle front side (the X1 direction side).

The support rubber 2 is made of a rubber elastic body and is provided in order to suppress vibration transmission between the sub-muffler 152 and a vehicle body. The support rubber 2 is attached to a rod (not shown) provided at the vehicle body, and the rod 13 of the bracket 1 is attached to the support rubber 2. The support rubber 2 has an annular portion 2a, a connecting portion 2b, a hole portion 2c, and a rod mounting portion 2d.

The annular portion 2a is formed in an elliptical shape when viewed from the front (in the axial direction of the case main body 1521a). The connecting portion 2b is disposed in the annular portion 2a and configured to connect the opposed inner surfaces of the annular portion 2a. The connecting portion 2b is formed so as to pass through the center of the annular portion 2a and extend in a width direction (the vehicle width direction) of the annular portion 2a having an elliptical shape. The hole portion 2c is formed so as to penetrate in a thickness direction (the axial direction of the case main body 1521a). The hole portion 2c is configured of a space defined by the annular portion 2a and the connecting portion 2b. The rod mounting portion 2d is disposed at each end portion in the longitudinal direction (an up-down direction) of the annular portion 2a having an elliptical shape. The rod mounting portion 2d has a slightly larger thickness than the annular portion 2a. An insertion hole 21 into which the rod 13 of the bracket 1 is inserted is formed in the rod mounting portion 2d on the lower side, and an insertion hole 22 into which the rod on the vehicle body side is inserted is formed in the rod mounting portion 2d on the upper side. The insertion holes 21, 22 are formed so as to penetrate in the thickness direction.

The second end portion 132 of the rod 13 is inserted into the insertion hole 21, whereby the bracket 1 is attached to the support rubber 2. The rod on the vehicle body side is inserted into the insertion hole 22, whereby the support rubber 2 is attached to the vehicle body. That is, the support rubber 2 is hung on the rod on the vehicle body side, and the bracket 1 is supported by the support rubber 2.

In the support structure 100 of this embodiment, the support rubber 2 is disposed at a position corresponding to the bracket 1, and a space S (refer to FIG. 3) is formed between the bracket 1 and the sub-muffler 152. Specifically, as shown in FIG. 4, the length in the width direction of the first plate 11 is made larger than the thickness of the support rubber 2, and the support rubber 2 is disposed within the first plate 11 in the axial direction of the case main body 1521a. The length in the width direction of the second plate 12 is made larger than the length in the width direction of the first plate 11, and the first plate 11 is disposed within the second plate 12 in the axial direction of the case main body 1521a. As shown in FIG. 3, the space S is formed between the first plate 11 and the case main body 1521a, and the space S is partitioned into the first space S1 and the second space S2 by the second plate 12. Due to the above, the first plate 11, the first space S1, the second plate 12, and the second space S2 are disposed between the support rubber 2 and the case main body 1521a. That is, the first plate 11 and the second plate 12 are configured to function as a double structure heat shield plate.

The bracket 1 configures a part of the mass of the sub-muffler 152. Therefore, for example, the thicknesses of the first plate 11 and the second plate 12 are set so as to obtain the mass that is needed for the sub-muffler 152 in order to suppress the resonance between the sub-muffler 152 and the vehicle body. That is, the first plate 11 and the second plate 12 are configured to function as a mass for adjusting the mass of the sub-muffler 152. Then, the mass of the sub-muffler 152 is adjusted by the thicknesses of the first plate 11 and the second plate 12.

Effects

In this embodiment, as described above, both end portions 11a of the first plate 11 are attached to the second plate 12, and both end portions 12a of the second plate 12 are attached to the sub-muffler 152. The first space S1 is formed between the first plate 11 and the second plate 12, and the second space S2 is formed between the second plate 12 and the sub-muffler 152. The first space S1 has the open ends OE1a, OE1b, and the second space S2 has the open ends OE2a, OE2b. The first plate 11, the first space S1, the second plate 12, and the second space S2 are disposed between the support rubber 2 and the sub-muffler 152. With the configuration as described above, the first plate 11 and the second plate 12 function as a double structure heat shield plate, so that heat transmission from the sub-muffler 152 to the support rubber 2 can be suppressed. That is, a radiant heat from the sub-muffler 152 due to a rise in the temperature of the sub-muffler 152 can be blocked off by the second plate 12, and therefore, the radiant heat from the sub-muffler 152 can be restrained from being transmitted to the support rubber 2. Further, even though the temperature of the second plate 12 rises due to the radiant heat from the sub-muffler 152, it is possible to make it difficult for the heat of the second plate 12 to be transmitted to the first plate 11. Further, the bracket 1 can be cooled by traveling air that passes through the first space S1 and the second space S2. As a result, thermal deterioration of the support rubber 2 can be further suppressed. In addition, since the flow of the traveling air can be restrained from being hindered by the bracket 1, it is possible to suppress deterioration of an air resistance coefficient and suppress wind noise.

In this embodiment, the rod 13 is formed in a hollow shape, whereby heat conduction from the first plate 11 to the support rubber 2 through the rod 13 can be suppressed compared to a case where the rod is solid. In this way, the thermal deterioration of the support rubber 2 can be further suppressed.

In this embodiment, the rod 13 is disposed such that the opening portions OE3a, OE3b face the vehicle front side, and therefore, in a case where the traveling air flows through the rod 13, the rod 13 can be cooled, so that a rise in the temperature of the rod 13 can be suppressed. In this way, the thermal deterioration of the support rubber 2 can be further suppressed.

In this embodiment, the first plate 11 and the second plate 12 function as a mass for adjusting the mass of the sub-muffler 152, so that it is possible to suppress the resonance between the sub-muffler 152 and the vehicle body while suppressing an increase in the number of parts.

In this embodiment, the flange portions 113 (the end portions 11a) of the first plate 11 are joined to the second plate 12, so that the contact area between the first plate 11 and the second plate 12 is relatively small, and therefore, it is possible to make it difficult for crevice corrosion to occur. Similarly, the flange portions 125 (the end portions 12a) of the second plate 12 are joined to the case main body 1521a, so that the contact area between the second plate 12 and the case main body 1521a is relatively small, and therefore, it is possible to make it difficult for crevice corrosion to occur.

Other Embodiments

The embodiment disclosed here is exemplification in all respects and does not become a basis for a limited interpretation. Therefore, the technical scope of the disclosure is not interpreted solely by the embodiment described above, and is defined based on the claims. All changes within meanings and a scope equivalent to the claims are included in the technical scope of the disclosure.

For example, in this embodiment, an example in which the support structure 100 supports the sub-muffler 152 has been described. However, there is no limitation to the example, and the support structure may be made so as to support other exhaust system parts such as an exhaust pipe.

In this embodiment, an example in which two sets of brackets 1 and support rubbers 2 are provided symmetrically in the right and left has been described. However, there is no limitation to the example, and the number of brackets and support rubbers may be any number. For example, a plurality of sets of right and left brackets and support rubbers may be provided at intervals in the axial direction.

In this embodiment, a third plate (not shown) may be provided between the first plate 11 and the second plate 12 so as to partition the first space S1. The number of third plate may be one or may be plural.

In this embodiment, an example in which the rod 13 is hollow has been described. However, there is no limitation to the example, and the rod may be solid.

In this embodiment, an example in which the opening portions OE3a, OE3b of the rod 13 face the vehicle front side has been described. However, there is no limitation to the example, and the opening portions of the rod may be made so as to face the side other than the vehicle front side.

In this embodiment, the support rubber 2 has been described as an example of the support member. However, there is no limitation to the example, and the support member may be an elastic body made of an elastomer.

In this embodiment, an example in which the lengths in the width direction of both the first plate 11 and the second plate 12 are larger than the thickness of the support rubber 2 has been described. However, there is no limitation to the example, and the length in the width direction of any one of the first plate and the second plate may be smaller than the thickness of the support rubber.

In this embodiment, an example in which the first plate 11 and the second plate 12 are made to function as a mass and a dedicated mass for adjusting the mass of the sub-muffler 152 is not provided has been described. However, there is no limitation to the example, and a dedicated mass for adjusting the mass of the sub-muffler may be provided.

In this embodiment, an example in which the mass of the sub-muffler 152 is adjusted by the thicknesses of the first plate 11 and the second plate 12 has been described. However, there is no limitation to the example, and the mass of the sub-muffler may be adjusted by the areas (the lengths in the longitudinal direction and the lengths in the width direction) of the first plate and the second plate. In a case where a third plate is provided between the first plate and the second plate, the mass of the sub-muffler may be adjusted by the number of third plates.

A support structure for an exhaust system part supports an exhaust system part configuring an exhaust system of an internal combustion engine for a vehicle.

What is claimed is:

1. A support structure for an exhaust system part that configures an exhaust system of an internal combustion engine for a vehicle, the support structure comprising:
   a metallic bracket, the bracket being attached to the exhaust system part; and
   a support member configured to support the bracket, the support member being made of an elastic body, wherein:
   the bracket includes a first plate and a second plate, the first plate having a first end portion and a second end portion as viewed in a direction crossing a vehicle front-rear direction, the first end portion and the second end portion of the first plate each being attached to the second plate, and the second plate having a first end portion and a second end portion as viewed in the direction crossing the vehicle front-rear direction, the first end portion and the second end portion of the second plate each being attached to the exhaust system part, the first plate including a side surface portion that extends in a first direction toward the exhaust system part, the first end portion of the first plate extending from an end of the side surface portion and in a second direction oblique to the first direction, the first plate contacting the second plate along an entirety of the first end portion of the first plate, the second plate having an inner side surface portion extending in the first direction and parallel to the side surface portion of the first plate, the second plate further having a mounting base extending in the second direction and parallel to the first end portion of the first plate, and an outer side surface portion of the second plate extending obliquely between the mounting base and the first end portion of the second plate toward the exhaust system part;

a first space is defined between the first plate and the second plate;

a second space is defined between the second plate and the exhaust system part;

each of the first space and the second space has a first open end disposed on a vehicle front side, and has a second open end disposed on a vehicle rear side;

the first plate, the first space, the second plate, and the second space are disposed between the support member and the exhaust system part;

the support member is arranged at a position spaced apart from the first plate;

the first plate includes a groove-shaped portion at a central portion thereof, the groove-shaped portion being recessed toward the second plate in a direction that intersects the vehicle front-rear direction; and the second plate includes a groove shaped-portion at a central portion thereof, the groove-shaped portion being recessed toward the exhaust system part in the direction that intersects the vehicle front-rear direction.

2. The support structure according to claim 1, wherein:
the bracket includes a hollow rod;
a first end portion of the rod is attached to the first plate; and
a second end portion of the rod is attached to the support member.

3. The support structure according to claim 2, wherein the rod has an opening portion and is disposed such that the opening portion faces the vehicle front side.

4. The support structure according to claim 1, wherein:
the exhaust system part includes a sub-muffler extending in the vehicle front-rear direction; and
two sets of brackets and support members are provided such that one of the two sets is provided on a right side of the sub-muffler and the other one of the two sets is provided on a left side of the sub-muffler, and the two sets are provided symmetrically with respect to the sub-muffler.

5. A support structure for an exhaust system part that configures an exhaust system of an internal combustion engine for a vehicle, the support structure comprising:
a metallic bracket, the bracket being attached to the exhaust system part; and
a support member configured to support the bracket, the support member being made of an elastic body, wherein:
the bracket includes a first plate and a second plate, the first plate having a first end portion and a second end portion as viewed in a direction crossing a vehicle front-rear direction, the first end portion and the second end portion of the first plate each being attached to the second plate, and the second plate having a first end portion and a second end portion as viewed in the direction crossing the vehicle front-rear direction, the first end portion and the second end portion of the second plate each being attached to the exhaust system part, the first plate including a side surface portion that extends in a first direction toward the exhaust system part, the first end portion of the first plate extending from an end of the side surface portion and in a second direction oblique to the first direction, the first plate contacting the second plate along an entirety of the first end portion of the first plate, the second plate having an inner side surface portion extending in the first direction and parallel to the side surface portion of the first plate, the second plate further having a mounting base extending in the second direction and parallel to the first end portion of the first plate, and an outer side surface portion of the second plate extending obliquely between the mounting base and the first end portion of the second plate toward the exhaust system part;

a first space is defined between the first plate and the second plate;

a second space is defined between the second plate and the exhaust system part;

each of the first space and the second space has a first open end disposed on a vehicle front side, and has a second open end disposed on a vehicle rear side;

the first plate, the first space, the second plate, and the second space are disposed between the support member and the exhaust system part;

the bracket includes a hollow rod;

a first end portion of the rod is attached to the first plate;

a second end portion of the rod is attached to the support member; and both an opening portion on the first end portion of the rod and an opening portion on the second end portion of the rod are disposed so as to face the vehicle front side.

6. A support structure for an exhaust system part that configures an exhaust system of an internal combustion engine for a vehicle, the support structure comprising:
a metallic bracket, the bracket being attached to the exhaust system part; and
a support member configured to support the bracket, the support member being made of an elastic body, wherein:
the bracket includes a first plate and a second plate, the first plate having a first end portion and a second end portion as viewed in a direction crossing a vehicle front-rear direction, the first end portion and the second end portion of the first plate each being attached to the second plate, and the second plate having a first end portion and a second end portion as viewed in the direction crossing the vehicle front-rear direction, the first end portion and the second end portion of the second plate each being attached to the exhaust system part, the first plate including a side surface portion that extends in a first direction toward the exhaust system part, the first end portion of the first plate extending from an end of the side surface portion and in a second direction oblique to the first direction, the first plate contacting the second plate along an entirety of the first end portion of the first plate, the second plate having an inner side surface portion extending in the first direction and parallel to the side surface portion of the first plate, the second plate further having a mounting base extending in the second direction and parallel to the first end portion of the first plate, and an outer side surface portion of the second plate extending obliquely between the mounting base and the first end portion of the second plate toward the exhaust system part;

a first space is defined between the first plate and the second plate;

a second space is defined between the second plate and the exhaust system part;

each of the first space and the second space has a first open end disposed on a vehicle front side, and has a second open end disposed on a vehicle rear side;

the first plate, the first space, the second plate, and the second space are disposed between the support member and the exhaust system part;

the bracket includes a hollow rod;

a first end portion of the rod is attached to the first plate, a portion of the first plate to which the first end portion of the rod is attached being recessed toward the second plate;

a second end portion of the rod is attached to the support member; and a sub-muffler, the second plate, the first plate, the rod and the support member are disposed in this order along a vehicle width direction, the support member being an elastic body made of an elastomer.

\* \* \* \* \*